(12) United States Patent
Yamada

(10) Patent No.: US 8,289,860 B2
(45) Date of Patent: Oct. 16, 2012

(54) APPLICATION MONITOR APPARATUS

(75) Inventor: Kenshin Yamada, Tokyo (JP)

(73) Assignee: NEC Corporation, Tokyo (JP)

( * ) Notice: Subject to any disclaimer, the term of this patent is extended or adjusted under 35 U.S.C. 154(b) by 1002 days.

(21) Appl. No.: 11/274,181

(22) Filed: Nov. 16, 2005

(65) Prior Publication Data

US 2006/0109798 A1    May 25, 2006

(30) Foreign Application Priority Data

Nov. 24, 2004 (JP) ................................ 2004-338264

(51) Int. Cl.
  *H04J 3/14* (2006.01)
(52) U.S. Cl. ...................................... 370/252; 370/412
(58) Field of Classification Search ................ 370/412, 370/418, 237, 230.1, 231
See application file for complete search history.

(56) References Cited

U.S. PATENT DOCUMENTS

| | | | | |
|---|---|---|---|---|
| 6,600,721 B2 * | 7/2003 | Edholm | ........................ | 370/232 |
| 2003/0162499 A1 * | 8/2003 | Jonsson | ........................... | 455/41 |
| 2004/0120252 A1 * | 6/2004 | Bowen et al. | ................. | 370/229 |
| 2005/0128989 A1 * | 6/2005 | Bhagwat et al. | .............. | 370/338 |
| 2007/0036095 A1 * | 2/2007 | Fuhrmann et al. | ............ | 370/282 |

FOREIGN PATENT DOCUMENTS

| | | |
|---|---|---|
| JP | 11-243389 A | 9/1999 |
| JP | 2002-009843 A | 1/2002 |
| JP | 2003-174489 A | 6/2003 |
| JP | 2004-214755 A | 7/2004 |

* cited by examiner

*Primary Examiner* — Kevin C Harper
*Assistant Examiner* — Henry Baron
(74) *Attorney, Agent, or Firm* — Sughrue Mion, PLLC

(57) ABSTRACT

An application monitor apparatus is provided that enables feedback to be sent to a transmitting terminal without relay processing of application data in the application layer. A packet transmission decision unit outputs to an application monitor unit and a packet transmitting unit only packets for which transmission is authorized by both the application monitor unit and the packet transmitting unit. When monitoring processing of the application monitor unit is slower than the rate of receiving packets at a packet receiving unit, the packet transmission decision unit sends feedback to the packet receiving unit to delay the transmission of packets.

17 Claims, 14 Drawing Sheets

FIG. 3

| CONNECTION ID | APPLICATION MONITOR MEANS TRANSMISSION AUTHORIZATION | PACKET TRANSMITTING MEANS TRANSMISSION AUTHORIZATION |
|---|---|---|
| 0 | OK | OK |
| 1 | NG | NG |
| 2 | OK | NG |
| 3 | NG | OK |

FIG. 5

| CONNECTION ID | BUFFER STORAGE AMOUNT | APPLICATION MONITOR MEANS TRANSMISSION AUTHORIZATION AMOUNT | PACKET TRANSMITTING MEANS TRANSMISSION AUTHORIZATION AMOUNT |
|---|---|---|---|
| 0 | 2000 | 3000 | 1000 |
| 1 | 3000 | 0 | 0 |
| 2 | 0 | 2000 | 3000 |
| 3 | 2000 | 0 | 2000 |

FIG. 7

| CONNECTION ID | BUFFER STORAGE SEQUENCE | APPLICATION MONITOR MEANS TRANSMISSION COMPLETION SEQUENCE | PACKET TRANSMITTING MEANS TRANSMISSION COMPLETION SEQUENCE | APPLICATION MONITOR MEANS TRANSMISSION AUTHORIZATION SEQUENCE | PACKET TRANSMITTING MEANS TRANSMISSION AUTHORIZATION SEQUENCE | (BUFFER STORAGE AMOUNT) |
|---|---|---|---|---|---|---|
| 0 | 5000 | 5000 | 1000 | 7000 | 3000 | 4000 |
| 1 | 3000 | 3000 | 3000 | 4000 | 5000 | 0 |
| 2 | 6000 | 4000 | 4000 | 5000 | 8000 | 2000 |
| 3 | 7000 | 2000 | 4000 | 2000 | 4000 | 5000 |

APPLICATION MONITOR APPARATUS

BACKGROUND OF THE INVENTION

1. Field of the Invention

The present invention relates to an application monitor apparatus, and more particularly to an application monitor apparatus that is required for monitoring processing in which a data loss does not arise in real time.

2. Related Art

The importance of functions that monitor data communicated between a transmitting terminal and a receiving terminal has been increasing in recent years accompanying the explosive spread in the use of the Internet. In particular, monitoring processing requires not only layer 3 (IP: Internet Protocol), layer 4 [TCP (Transmission Control Protocol)] and UDP (User Datagram Protocol)], but also complex monitoring processing that refers to the contents of an application layer.

Further, when utilizing monitoring processing for accounting or the like, it is necessary for an application monitor apparatus to execute complete monitoring processing in real time without losing the data that is the object of monitoring.

In general, methods of monitoring application data communicated between a transmitting terminal and a receiving terminal can be broadly classified into two kinds. The first kind is a method that monitors the communicated packets without influencing the communication between the transmitting terminal and the receiving terminal (for example, see Japanese Patent Laid-Open No. 11-243389).

A configuration example of an application monitor apparatus that utilizes this first method is shown in FIG. 12. In FIG. 12, an application monitor apparatus 8 comprises a packet receiving means 81 and an application monitor means 82.

Packets that are transmitted from transmitting terminals 1 (1-1, 1-2, . . . , 1-N) are input into receiving terminals 2 (2-1, 2-2, . . . , 2-N) via a plurality of intermediary devices 3 (3-1, 3-2). A data replication means 7 is present at some point along the path of communication between the transmitting terminal 1 and the receiving terminal 2, and all of the replicated packets are input into the application monitor apparatus 8.

As the intermediary devices 3, routers, LAN (Local Area Network) switches, repeaters and the like are used. Although in FIG. 12 the transmitting terminals 1 and the receiving terminals 2 are connected to one of the intermediary devices 3, respectively, this merely represents one example of a connection between the transmitting terminals 1, receiving terminals 2 and intermediary devices 3 on the Internet. Configurations can also be considered in which a plurality of the intermediary devices 3 are provided and in which no intermediary devices 3 are provided, and the connection configuration thereof is arbitrary. Further, although the transmitting terminal 1 and receiving terminal 2 are described separately in FIG. 12 to facilitate explanation, in general an actual terminal has the functions of both the transmitting terminal 1 and the receiving terminal 2.

All of the packets that are input to the application monitor apparatus 8 are subjected to termination processing up to layer 4 (transport layer) in the packet receiving means 82 to assemble the application data, after which the required monitoring processing is carried out in the application monitor means 81. With respect to the termination processing up to layer 4, it is not necessary to execute all the layer 4 termination processing in the receiving terminals 2.

For example, when layer 4 is TCP, although it is necessary to perform processing that reassembles the data in order to guarantee the data sequence, there is no necessity to transmit data to the transmitting terminal 1, such as when processing an ACK (acknowledgement) transmission to the transmitting terminal 1. Further, when layer 4 is UDP, special processing is not required and data may be simply passed to the application monitor means 81.

According to the first method, when the processing speed at the application monitor means 81 is lower than the rate of inputting packets to the packet receiving means 82, a data loss is generated inside the application monitor apparatus 8 and complete monitoring processing cannot be executed.

The second method is one in which an application monitor apparatus relays application data between a transmitting terminal and a receiving terminal and performs monitoring processing at the time of the relay processing. In order to relay the application data it is necessary for the monitor apparatus to execute termination processing up to layer 4.

A configuration example of an application monitor apparatus that utilizes this second method is shown in FIG. 13. In FIG. 13, an application monitor apparatus 9 comprises a packet receiving means 91, an application monitor means 92 and a packet transmitting means 93.

Packets that are transmitted from the transmitting terminals 1 (1-1, 1-2, . . . , 1-N) always pass through the application monitor apparatus 9 via the intermediary device 3-1 to be transferred to the receiving terminals 2 (2-1, 2-2, . . . , 2-N) via the intermediary device 3-2. The packets that are input into the application monitor apparatus 9 undergo termination processing up to layer 4 in the packet receiving means 91, and are then input into the application monitor means 92.

When layer 4 is TCP, the termination processing up to layer 4 in the packet receiving means 91 includes ACK transmission processing with respect to the transmitting terminal 1. Accordingly, with the application monitor apparatus 9 of the second method it is possible to execute rate control for the input traffic. More specifically, when the processing speed at the application monitor means 92 is slower than the rate of inputting packets to the packet receiving means 91, by transmitting feedback from the application monitor means 92 to the packet receiving means 91 the transmitting terminal 1 dynamically controls the rate of transmitting packets with the TCP rate control.

Therefore, according to the second method monitoring can be executed in which packet loss does not occur. In this connection, although according to the second method communication between the transmitting terminals 1 and receiving terminals 2 is split into two parts by the application monitor apparatus 9, the application monitor apparatus 9 may comprise one of two kinds of apparatus. The first kind is an apparatus such as a proxy server, in which case the transmitting terminals 1 and receiving terminals 2 know of the existence of the application monitor apparatus 9. The second kind is a stealth type of apparatus, in which case the transmitting terminals 1 and receiving terminals 2 do not know of the existence of the application monitor apparatus 9.

More specifically, the term "know of the existence of the application monitor apparatus 9" refers to the transmitting terminals 1 transmitting the packets to the application monitor apparatus 9 with the assumption that layer 4 termination will be conducted once at the application monitor apparatus 9.

FIG. 14 shows a detailed configuration of an application monitor apparatus that utilizes the above-described second method. In FIG. 14, after packets that are received from a network (not shown) are subjected to termination processing up to IP layer at an IP receiver processing part 101, TCP termination processing is conducted at a TCP receiver processing part 102 and the data is then passed to an application monitoring processing part 105.

After the application monitoring processing part 105 performs the required monitoring processing it carries out a request to transmit data to a TCP transmission processing part 103. After subjecting the transmitting data to termination processing of the TCP layer at the TCP transmission processing part 103, and then performing termination processing up to the IP layer at the IP transmission processing part 104, the packets are transmitted to the network.

As the TCP termination processing performed at the TCP receiver processing part 102 and the TCP transmission processing part 103, it is necessary to execute all TCP processing such as guaranteeing the packet sequence, send processing of ACK packets, rate control at the transmitting side and receiving side, and control for retransmission of packets. Further, the TCP receiver processing part 102, the TCP transmission processing part 103 and the application monitoring processing part 105 are generally connected by an API (Application Programming Interface) called a "socket", and it is known that TCP processing also entails heavy processing in the respect that each of these parts always requires a copy of the data being transmitted or received.

Examples of the application monitor apparatus 10 that utilizes the second method include a firewall device (application gateway) that refers to the application layer and a proxy server.

In the above-described conventional application monitor apparatus utilizing the first method, a problem exists in that feedback can not be sent from the application monitor apparatus to the transmitting terminal. More specifically, when the processing performance of the application monitor means is lower than the performance of processing communication between the transmitting and receiving terminals in the application monitor apparatus utilizing the first method, complete monitoring processing can not be carried out because the monitoring processing does not keep up with the rate of communication between the transmitting terminal and receiving terminal and a packet loss occurs.

Further, according to the conventional application monitor apparatus utilizing the second method, since it is necessary for the application monitor means to perform monitoring processing of data at the application layer and also to relay data received from a packet receiving means to a packet transmitting means, there is a problem in that the processing load required to execute monitoring processing is extremely heavy in the application monitor apparatus that utilizes the second method.

In this case, it is necessary to execute all the TCP termination processing including guaranteeing the packet sequence, send processing of ACK packets, rate control at the transmitting side and receiving side, and control for retransmission of packets. A heavy processing load thus exists, particularly in the TCP receiver processing part and TCP transmission processing part.

Further, the socket API for connecting the TCP receiver processing part, the TCP transmission processing part and the application monitoring processing part is also a factor that produces a heavy processing load in the respect that a copy of data being sent and received is always required at each respective part when data passes from the TCP receiver processing part to the application monitoring processing part and then from the application monitoring processing part to the TCP transmission processing part.

Since it is necessary to always continue execution of relay processing for the corresponding connection, even after the application monitor means decides that monitoring processing is unnecessary, there is a problem that the processing load for executing the monitoring processing is extremely heavy in the application monitor apparatus that utilizes the second method.

BRIEF SUMMARY OF THE INVENTION

Thus, an object of the present invention is to solve the above described problems by providing an application monitor apparatus that can send feedback to a transmitting terminal without conducting relay processing of application data for an application layer.

An application monitor apparatus according to the present invention comprises packet receiving means that receives packets from a network, packet transmitting means that transmits packets to the network, and application monitor means that performs monitoring processing for packets that are received by the packet receiving means; wherein the application monitor apparatus has packet transmission decision means that includes means that transmits packets that are input from the packet receiving means to both the application monitor means and the packet transmitting means, and decision means that decides whether or not to transmit packets input from the packet receiving means to both the application monitor means and the packet transmitting means on the basis of information from the application monitor means and the packet transmitting means, respectively.

According to the application monitor apparatus of the present invention, since the packet transmission decision means carries out the transfer of packets to the application monitor apparatus and the packet transmitting means only at a time when both the application monitor means and the packet transmitting means are capable of receiving the packets, it is guaranteed that all packets that arrive at a receiving terminal from the packet transmitting means also arrive at the application monitor means.

When processing at the application monitor means is slow, direct feedback is sent to ensure that packets are not transmitted from the packet transmission decision means to the application monitor means and the packet transmitting means, and thus it is also guaranteed that a packet loss will not occur.

Furthermore, since it is not necessary for the application monitor means to relay data from the packet receiving means to the packet transmitting means, the application monitor means need perform only monitoring processing and thus high-speed monitoring processing can be realized. In particular, according to application monitor means to be described later the only processing that is required in the TCP (Transmission Control Protocol) layer is assembly processing for packets in order to guarantee the packet sequence for the TCP connection. Since no other TCP termination processing such as transmission processing of ACK (acknowledgement) packets, rate control at the transmitting side and receiving side or control for retransmission of packets is required, the processing is performed at a high speed.

Further, it has been pointed out that the load of copy processing of data transmitted through the socket API (Application Programming Interface) is heavy for the application monitor apparatus utilizing the second method when transmitting data from the application monitoring processing part to the TCP transmission processing part. However, according to the application monitor apparatus of the present invention, since it is not necessary to transmit data from the application monitor means it is possible to reduce the load caused by the buffer copy processing.

Also, for cases in which the monitoring processing has become unnecessary, since it is not necessary for the application monitor means to process the packets of the corresponding connection and only the connections that require the monitoring processing need be processed, it is possible to realize extremely high-speed monitoring processing.

BRIEF DESCRIPTION OF THE DRAWINGS

FIG. 3 is a view showing one example of a transmission authorization table shown in FIG. 2;

FIG. 5 is a view showing one example of a transmission authorization table shown in FIG. 4;

FIG. 7 is a view showing one example of a transmission authorization table shown in FIG. 6;

DETAILED DESCRIPTION OF THE PREFERRED EMBODIMENTS

Figure 1:
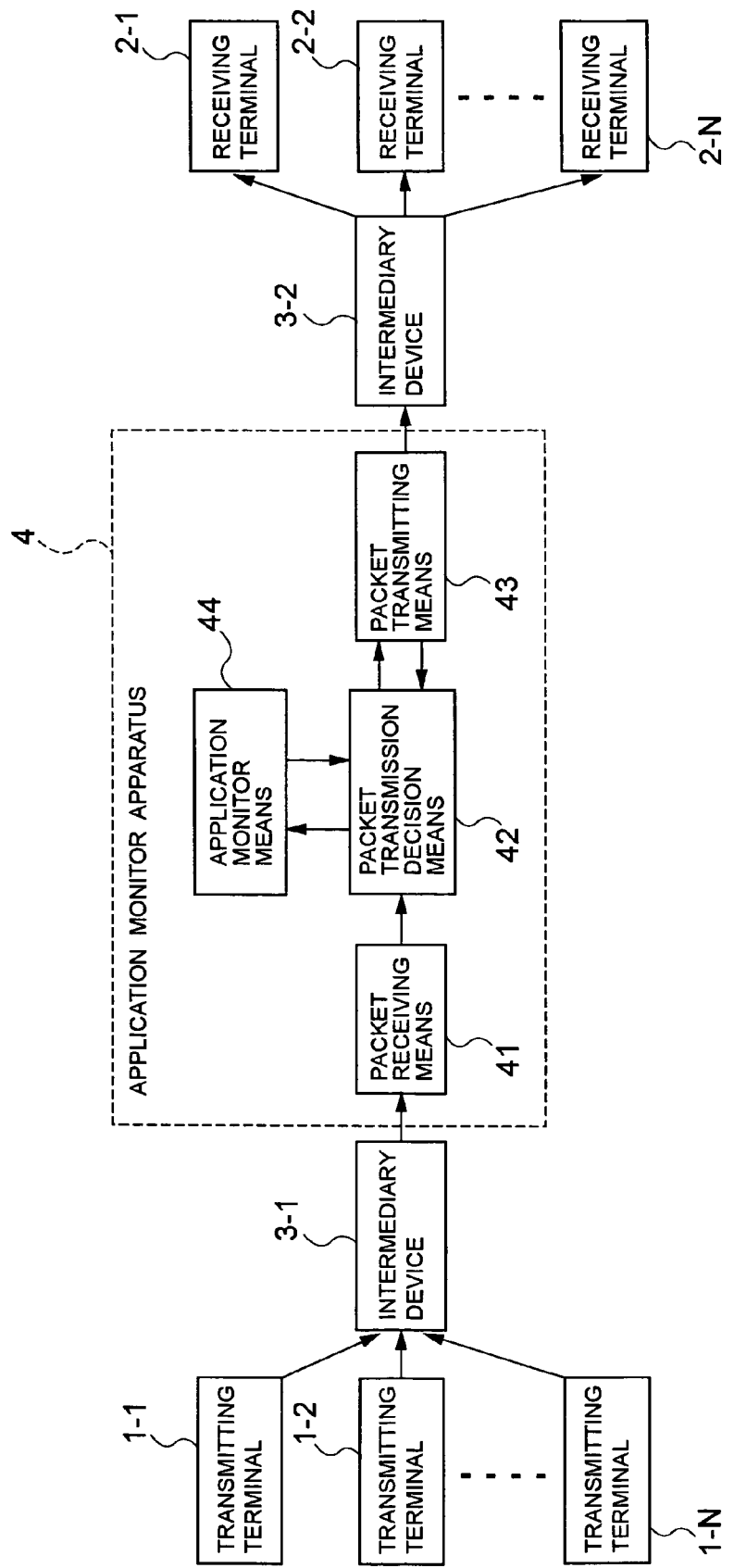
FIG. 1 is a block diagram showing the configuration of an application monitor apparatus according to an embodiment of the present invention.

Next, an embodiment of the present invention is described referring to the drawings. FIG. 1 is a block diagram showing the configuration of an application monitor apparatus according to an embodiment of the present invention. In FIG. 1, an application monitor apparatus 4 according to the embodiment of the present invention comprises packet receiving means 41, packet transmission decision means 42, packet transmitting means 43 and application monitor means 44.

At the packet receiving means 41, after termination processing of the necessary layer is performed for packets received from a network [in FIG. 1, packets received from transmitting terminals 1 (1-1, 1-2, . . . , 1-N) through an intermediary device 3-1], packets are output to the packet transmission decision means 42.

The packet transmission decision means 42 transmits to both the application monitor means 44 and the packet transmitting means 43 the packets that are input from the packet receiving means 41 only when it decides that it is possible to transmit the packets to both the application monitor means 44 and the packet transmitting means 43 in accordance with information that is input from both the application monitor means 44 and the packet transmitting means 43.

Further, in a case where the packet transmission decision means 42 cannot send to the application monitor means 44 and the packet transmitting means 43 the packets that are input from the packet receiving means 41, the packet transmission decision means 42 causes the packet transmitting rate to be lowered by transmitting feedback to the transmitting terminal 1.

Methods for transmitting feedback to the transmitting terminal 1 will be described later, and these methods include a method that notifies the transmitting terminal 1 that the packet transmission rate is too high by simply discarding packets and a method that utilizes the rate control of the TCP (Transmission Control Protocol) layer.

After the packet transmitting means 43 carries out the termination processing of the layer that is required for packet transmission, such as header creation, it transmits the packets to the network [in FIG. 1, packets are transmitted from the packet transmitting means 43 to the receiving terminals 2 (2-1, 2-2, . . . , 2-N) through an intermediary device 3-2]. The application monitor means 44 performs the required monitoring processing on the packets that are input from the packet transmission decision means 42.

Hereunder, the operation of the application monitor apparatus according to the embodiment of the present invention is described referring to FIG. 1.

Packets that are input from the network to the application monitor apparatus 4 are input into the packet transmission decision means 42 via the packet receiving means 41 inside the application monitor apparatus 4. The packet transmission decision means 42 sends to the application monitor means 44 and the packet transmitting means 43 only packets that it decides can be sent to both the packet transmitting means 43 and the application monitor means 44.

Since the transmission of packets is always authorized by the application monitor means 44 and the packet transmitting means 43 when the packet processing speed of the packet transmitting means 43 and the application monitor means 44 is sufficiently fast compared to the rate of inputting packets to the packet receiving means 41 from the transmitting terminal 1, packets are transmitted to the receiving terminal 2 without almost any delay.

In particular, when the packet transmitting means 43 can guarantee that it can transmit 100% of the packets input from the packet transmission decision means 42 to the network without any loss, there is no necessity for the packet transmitting means 43 to notify the packet transmission decision means 42 of information concerning whether or not the transmission of packets is possible, and thus the packet transmission decision means 42 can decide whether or not to transmit packets on the basis of only information from the application monitor means 44.

When monitoring processing at the application monitor means 44 is slower than the rate of inputting packet data from the packet receiving means 41 and the processing of all packets can not be executed, the application monitor means 44 notifies the packet transmission decision means 42 that it can not receive packets. Because the packet transmission decision means 42 transmits packets to the packet transmitting means 43 and the application monitor means 44 at a speed at which the application monitor means 44 can process all the packets, it is possible for the application monitor means 44 to realize the monitoring processing without packet loss.

Figure 2:
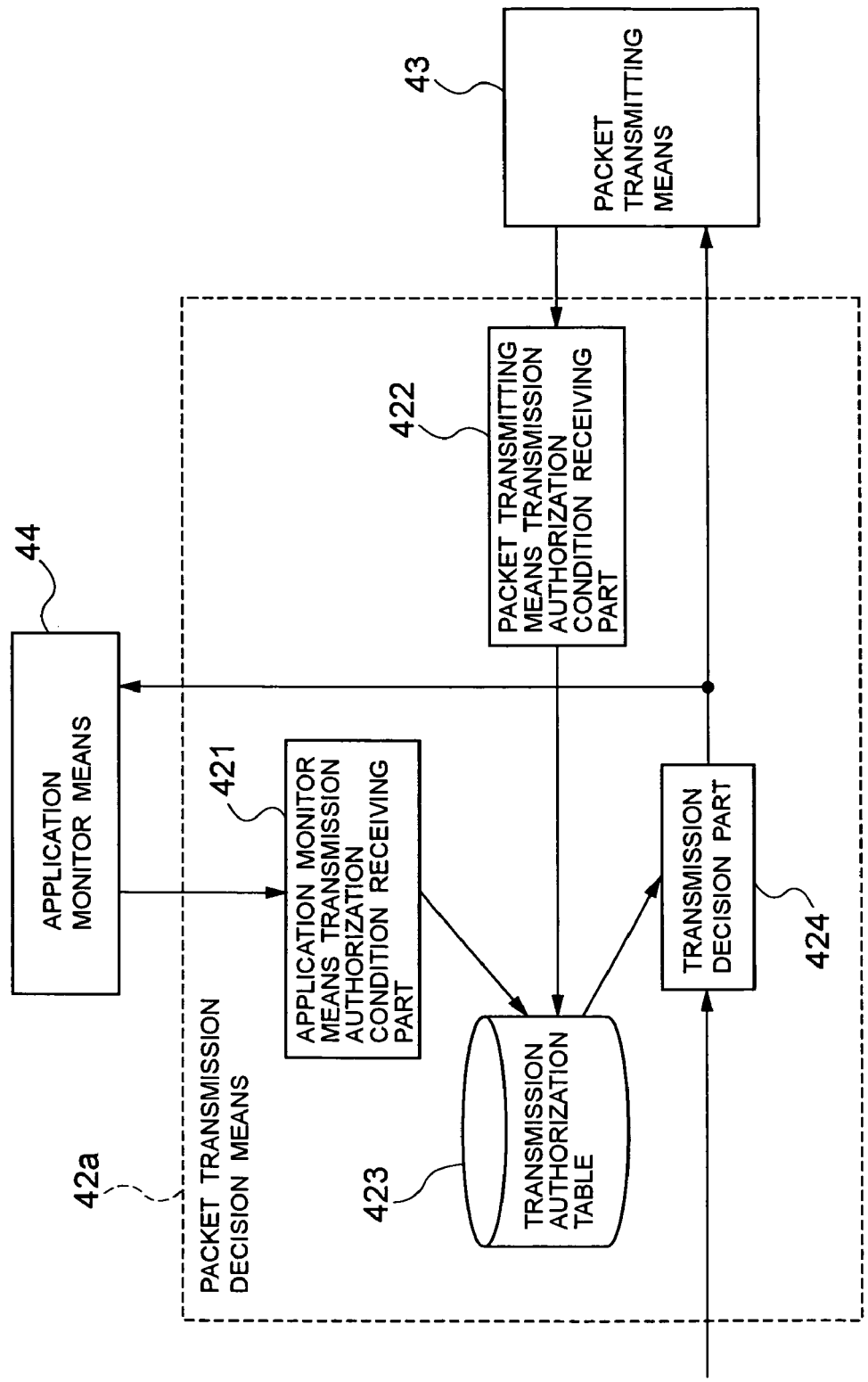
FIG. 2 is a block diagram showing a first configuration example of a packet transmission decision means of FIG. 1.

Next, a specific example of a transmission decision method of the packet transmission decision means 42 of FIG. 1 will be described. FIG. 2 is a block diagram showing a first configuration example of the packet transmission decision means 42 of FIG. 1, and FIG. 3 is a view showing one example of a transmission authorization table shown in FIG. 2. In FIG. 2, packet transmission decision means 42a comprises an application monitor means transmission authorization condition receiving part 421, a packet transmitting means transmission authorization condition receiving part 422, a transmission authorization table 423 and a transmission decision part 424.

The transmission authorization table 423 manages application monitor means transmission authorization information and packet transmitting means transmission authorization information for each connection (Connection ID) as shown in FIG. 3. For packets for which a transmission request is received, the transmission decision part 424 refers to the entry for the corresponding connection ID in the transmission authorization table 423 to check the application monitor means transmission authorization information and the packet transmitting means transmission authorization information.

The transmission decision part 424 only transmits packets to both the application monitor means 44 and the packet transmitting means 43 when transmission of packets is authorized to both the application monitor means 44 and the packet transmitting means 43, and when the transmission of packets is not authorized to either one of the application monitor means 44 and the packet transmitting means 43 the transmission decision part 424 discards the packets.

When the application monitor means transmission authorization condition receiving part 421 receives from the application monitor means 44 the transmission authorization information for the application monitor means 44, it updates the application monitor means transmission authorization information in the transmission authorization table 423. Similarly, when the packet transmitting means transmission authorization condition receiving part 422 receives from the packet transmitting means 43 the transmission authorization information for the packet transmitting means 43 it updates the packet transmitting means transmission authorization information in the transmission authorization table 423.

Figure 4:
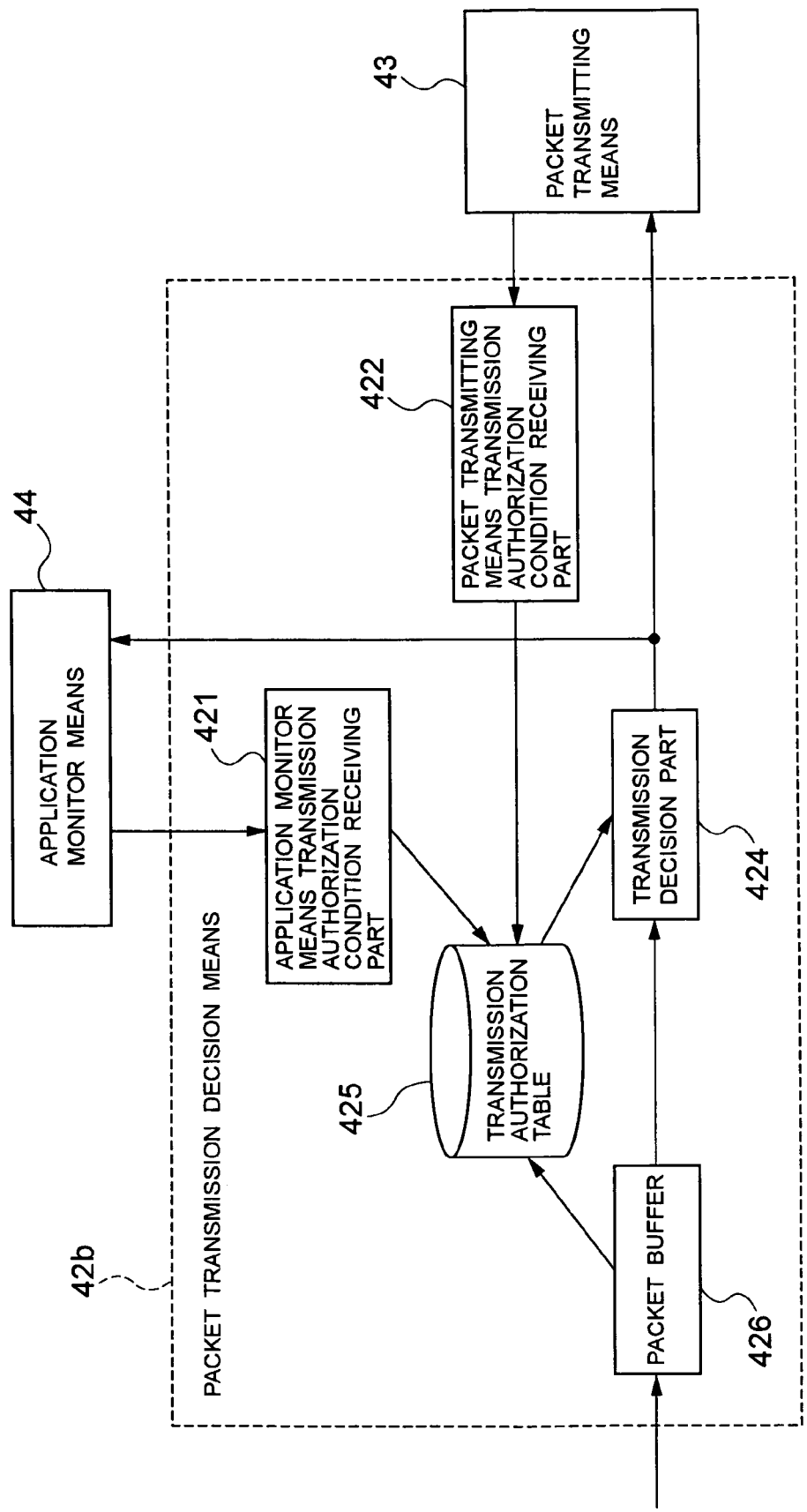
FIG. 4 is a block diagram showing a second configuration example of the packet transmission decision means of FIG. 1.

FIG. 4 is a block diagram showing a second configuration example of the packet transmission decision means 42 of FIG. 1, and FIG. 5 is a view showing one example of the transmission authorization table shown in FIG. 4. In FIG. 4, the packet transmission decision means 42b comprises the application monitor means transmission authorization condition receiving part 421, the packet transmitting means transmission authorization condition receiving part 422, a transmission authorization table 425, the transmission decision part 424 and a packet buffer 426.

Data that is input from the packet receiving means 41 is temporarily stored in connection units in the packet buffer 426. The transmission authorization table 425 manages the buffer storage amount, the application monitor means transmission authorization amount and the packet transmitting means transmission authorization amount for each connection (Connection ID) as shown in FIG. 5. When the packet buffer 426 receives packets from the packet receiving means 41 it updates the buffer storage amount relating to the corresponding connection ID of the transmission authorization table 425 to a value that is increased by the amount of the received packets.

The application monitor means transmission authorization condition receiving part 421 receives from the application monitor means 44 information regarding the number of bytes that can be transmitted to the application monitor means 44 and updates the application monitor means transmission authorization amount of the transmission authorization table 425. Similarly, the packet transmitting means transmission authorization condition receiving part 422 receives from the packet transmitting means 43 information regarding the number of bytes that can be transmitted to the packet transmitting means 43 and updates the packet transmitting means transmission authorization amount of the transmission authorization table 425.

When the information of the transmission authorization table 425 is updated, the transmission decision part 424 reads the entry relating to the updated connection ID and determines the lower value among the application monitor means transmission authorization amount and the packet transmitting means transmission authorization amount, that is, the amount that can be transmitted to both the application monitor means 44 and the packet transmitting means 43.

When the amount that can be transmitted to both of these is not 0 and the value of the buffer storage amount is also not 0, the transmission decision part 424 reads packets corresponding to the smallest value among the amount that can be transmitted to both of these and the buffer storage amount from the packet buffer 426 and transmits the packets to both the application monitor means 44 and the packet transmitting means 43.

Thereafter, the transmission decision part 424 subtracts the amount of the transmitted packets from the buffer storage amount, the application monitor means transmission authorization amount and the packet transmitting means transmission authorization amount to update the transmission authorization table 425. In this connection, although the above transmission authorization table 425 utilizes the buffer storage amount, the application monitor means transmission authorization amount and the packet transmitting means transmission authorization amount, for example, the same control can be carried out by utilizing a relative value such as the byte-sequence number of received data.

Figure 6:
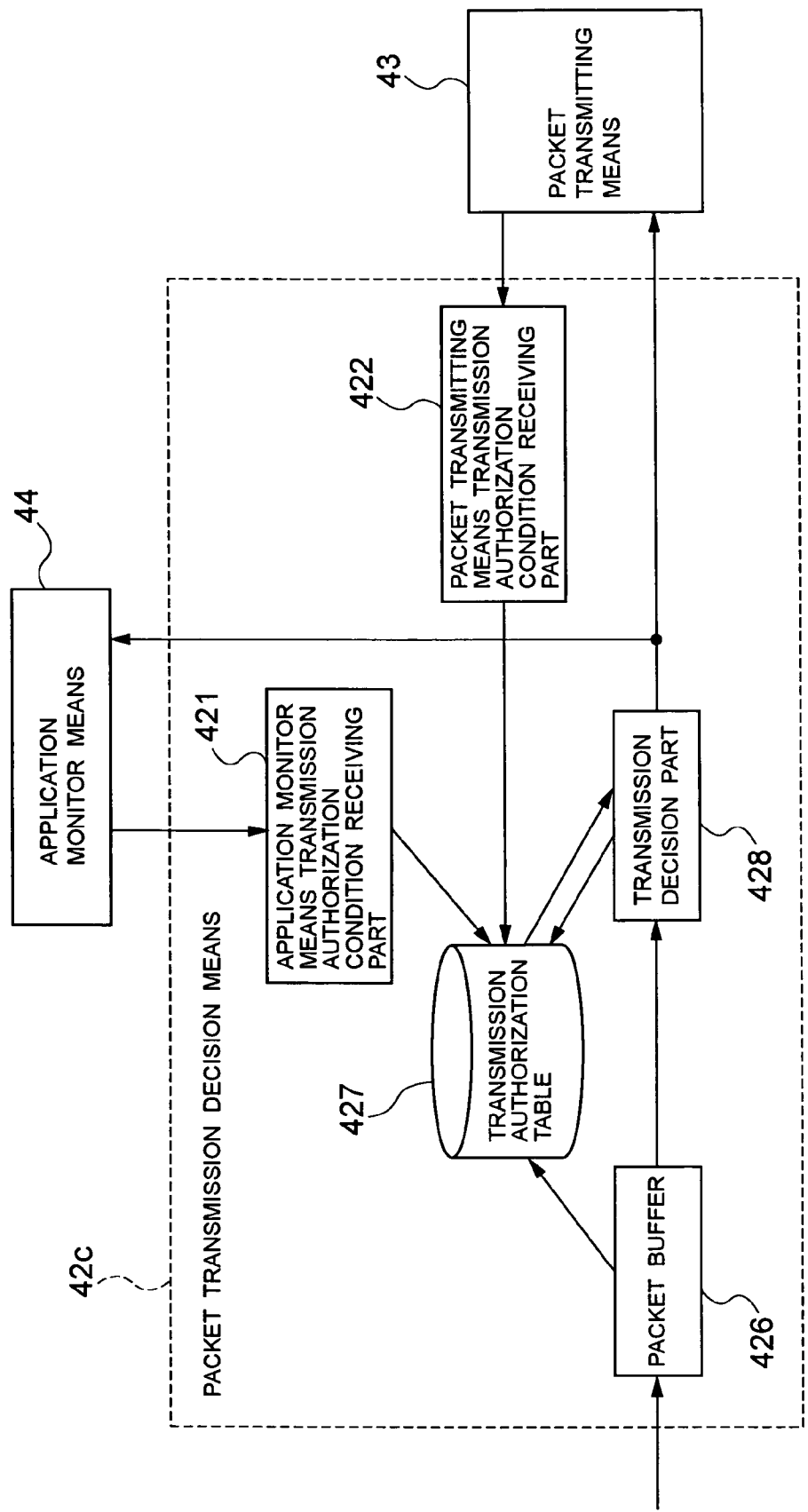
FIG. 6 is a block diagram showing a third configuration example of the packet transmission decision means of FIG. 1.
Figure 8:
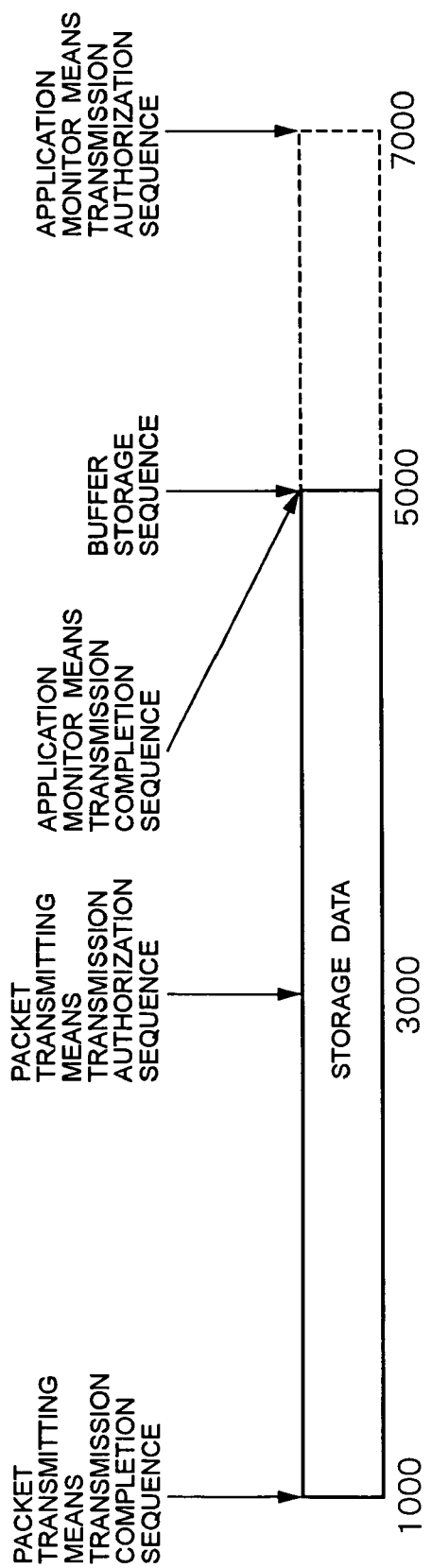
FIG. 8 is a view showing each component of the transmission authorization table shown in FIG. 7.

FIG. 6 is a block diagram showing a third configuration example of the packet transmission decision means 42 of FIG. 1, FIG. 7 is a view showing one example of a transmission authorization table shown in FIG. 6, and FIG. 8 is a view showing each component of the transmission authorization table shown in FIG. 7. In FIG. 6, packet transmission decision means 42c comprises the application monitor means transmission authorization condition receiving part 421, the packet transmitting means transmission authorization condition receiving part 422, a transmission authorization table 427, a transmission decision part 428 and the packet buffer 426.

According to this third configuration example, the transmission decision part 428 transmits packets separately to the application monitor means 44 and the packet transmitting means 43. The transmission authorization table 427 controls the transmission of data utilizing data byte-sequence numbers, and not the values for buffer storage amount and transmissible amount.

For each connection (Connection ID) the transmission authorization table 427 comprises a buffer storage sequence, an application monitor means transmission completion sequence, a packet transmitting means transmission completion sequence, an application monitor means transmission authorization sequence, a packet transmitting means transmission authorization sequence and a buffer storage amount (see FIG. 7 and FIG. 8). In this connection, although a buffer storage amount field is not essential as it can be calculated from the other fields, it is included in one field of the entries of this table in order to facilitate explanation of the third configuration example.

The terms "application monitor means transmission authorization sequence" and "packet transmitting means transmission authorization sequence" refer to the maximum sequence numbers that the application monitor means 44 and the packet transmitting means 43 are authorized to transmit, respectively. The application monitor means transmission authorization sequence is updated from the application monitor means 44 through the application monitor means transmission authorization condition receiving part 421. The packet transmitting means transmission authorization sequence is updated from the packet transmitting means 43 through the packet transmitting means transmission authorization condition receiving part 422.

The terms "application monitor means transmission completion sequence" and "packet transmitting means transmission completion sequence" refer to the ends of sequence numbers of data that has been transmitted to the application monitor means 44 and the packet transmitting means 43, respectively. The buffer storage sequence is the end of a sequence number of data stored in the packet buffer 426.

When the transmission authorization table 427 is updated the transmission decision part 428 reads out the corresponding connection ID entry. When the value of the application monitor means transmission authorization sequence and the value of the buffer storage sequence are both larger than the application monitor means transmission completion sequence, packets are transmitted to the application monitor means 44 until the value thereof reaches the value that is the smaller of the value for the application monitor means transmission authorization sequence and the value for the buffer storage sequence. After transmitting packets to the application monitor means 44, the transmission decision part 428 reads the value of the application monitor means transmission completion sequence to update it to the value of the transmission-completed sequence number.

Similarly, when the value of the packet transmitting means transmission authorization sequence and the value of the buffer storage sequence are both larger than the packet transmitting means transmission completion sequence, packets are transmitted to the packet transmitting means 43 until the value thereof reaches the value that is the smaller of the value for the packet transmitting means transmission authorization sequence and the value for the buffer storage sequence. After transmitting packets to the packet transmitting means 43, the transmission decision part 428 reads the value of the packet transmitting means transmission completion sequence to update it to the value of the transmission-completed sequence number.

According to the third configuration example, although it is possible for the transmission decision part 428 to transmit packets independently to the application monitor means 44 and the packet transmitting means 43, the feature of this configuration is that it can be guaranteed that ultimately the same data is transmitted to both the application monitor means 44 and the packet transmitting means 43.

Figure 9:
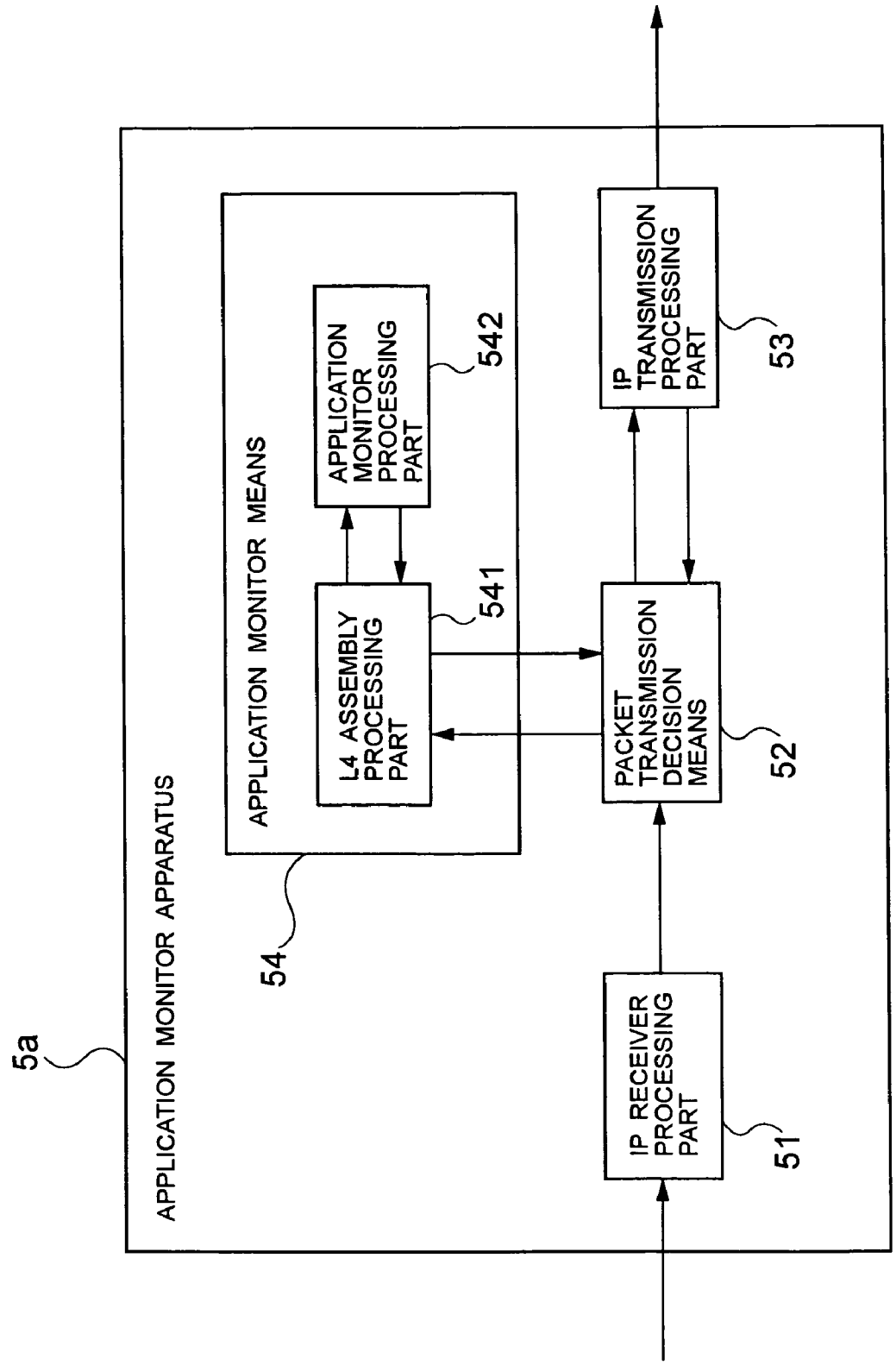
FIG. 9 is a block diagram showing the configuration of an application monitor apparatus according to the first example of the present invention.

FIG. 9 is a block diagram showing the configuration of an application monitor apparatus according to the first example of the present invention. In FIG. 9, an application monitor apparatus 5a according to the first example of the present invention comprises an IP (Internet Protocol) receiver processing part 51, packet transmission decision means 52, an IP transmission processing part 53 and application monitor means 54. The application monitor means 54 comprises an L4 (layer 4) assembly processing part 541 and an application monitoring processing part 542.

The IP receiver processing part 51 corresponds to the above-described packet receiving means 41, and the IP transmission processing part 53 corresponds to the above-described packet transmitting means 43. Further, the application monitor means 54 that is provided with the L4 assembly processing part 541 and the application monitoring processing part 542 corresponds to the application monitor means 44.

The IP receiver processing part 51 performs IP termination processing for data received from a network (not shown), and outputs packets to the packet transmission decision means 52. The IP transmission processing part 53 transmits packets that are received from the packet transmission decision means 52 to the network.

For packets received from the packet transmission decision means 52, the L4 assembly processing part 541 performs assembly of data according to necessity and then outputs the data to the application monitoring processing part 542. When layer 4 is UDP (User Datagram Protocol), since assembly of data is not necessary the L4 assembly processing part 541 outputs the packets as they are to the application monitoring processing part 542.

When layer 4 is TCP (Transmission Control Protocol), since there is a possibility that the packet sequence is changed, the received data is stored in a packet buffer (not shown) in the L4 assembly processing part 541, and after rearranging the packets according to their sequence the L4 assembly processing part 541 outputs the data that was rearranged into the proper sequence to the application monitoring processing part 542. However, when the processing of the application monitoring processing part 542 is not conducted in time, data for which assembly was completed also remains stored in the packet buffer and output of the packets is performed after transmission authorization is received from the application monitoring processing part 542.

When the rate of inputting packets into the L4 assembly processing part 541 from the packet transmission decision means 52 is higher than the rate of inputting packets into the application monitoring processing part 542 from the L4 assembly processing part 541, packets are stored in the packet buffer of the L4 assembly processing part 541. When, in accordance with the storage amount of the packet buffer, the L4 assembly processing part 541 determines that it should not receive packets, it notifies the packet transmission decision means 52 that it cannot store packets.

The application monitoring processing part 542 receives data that is arranged according to sequence from the L4 assembly processing part 541 and then executes the required monitoring processing. When the processing by the application monitoring processing part 542 of packets that are input from the L4 assembly processing part 541 is not conducted in time, the application monitoring processing part 542 notifies the L4 assembly processing part 541 that the monitoring processing is not being conducted in time.

Similarly to the packet transmission decision means 42a shown in FIG. 2, if packets that are input from the IP receiver processing part 51 are those for which transmission is authorized by both the L4 assembly processing part 541 and the IP transmission processing part 53, the packet transmission decision means 52 outputs the packets to both the L4 assembly processing part 541 and the IP transmission processing part 53. In all other cases, the packet transmission decision means 52 discards the packets received from the IP receiver processing part 51.

According to the first example of the present invention, when processing of the application monitor means 54 is not conducted in time, packets that are input into the packet transmission decision means 52 are discarded. When layer 4 is TCP, it is necessary for the transmitting terminal 1 to resend the packets that are discarded. As a result, the rate of inputting packets to the application monitor means 54 is lowered and it is possible to realize monitoring processing without any packet loss.

The second example of the present invention has the same configuration as the above-described application monitor apparatus 5a according to the first example of the present invention shown in FIG. 9, except that the contents of the packet transmission decision means 52 of the application monitor apparatus 5a according to the first example of the present invention are changed in the second example.

Similarly to the packet transmission decision means 42b shown in FIG. 4, the packet transmission decision means 52 according to the second example of the present invention has a packet buffer that stores received packets. When the packet transmission decision means 52 cannot transmit packets received from the IP receiver processing part 51, instead of discarding the packets it stores the packets in the packet buffer, and then transmits the packets when transmission of the packets is enabled.

However, when packets are received from the IP receiver processing part 51, the packets may be discarded depending on the buffer usage amount of the packet buffer. Methods of discarding packets include a method which simply discards packets when the packet buffer becomes full, and a method that discards packets at random utilizing AQM (Active Queue Management) such as RED (Random Early Discard) [see RFC (Request For Comments) 2309].

According to the second example of the present invention, since the packet transmission decision means 52 comprises the packet buffer, the probability of packets being discarded in succession by the packet transmission decision means 52 is lowered, and thus an effect is achieved that the probability of packets being discarded due to a temporary burst is reduced.

The third example of the present invention has the same configuration as the above-described application monitor apparatus 5a according to the first example of the present invention shown in FIG. 9, except that it is possible to distinguish each connection ID when making a decision as to whether or not transmission of packets is possible.

More specifically, the application monitoring processing part 542 notifies the L4 assembly processing part 541 as to whether or not reception of packets is possible for each connection, and the L4 assembly processing part 541 and the IP transmission processing part 53 notify the packet transmission decision means 52 as to whether or not reception of packets is possible for each connection.

The packet transmission decision means 52 has a function that determines whether or not transmission authorization for each connection is issued from both the L4 assembly processing part 541 and the IP transmission processing part 53. Thus, when packets are received from the IP receiver processing part 51, the packet transmission decision means 52 decides whether or not transmission of packets for the corresponding connection is possible. When transmission is possible packets are output to both the L4 assembly processing part 541 and the IP transmission processing part 53, and when the packet transmission decision means 52 decides that transmission is not possible the packets are discarded.

According to the third example of the present invention, by determining whether or not transmission of packets is possible for each connection, when a monitoring processing load is heavy for only a small number of connections the transmission rate is lowered by discarding packets of only the connections with a heavy load, and the monitoring processing can be implemented without packet loss for the other connections.

The packet transmission decision means 52 according to the third example of the present invention has a configuration and operation that are the same as the packet transmission decision means 42a shown in FIG. 2, and a detailed description thereof has thus been omitted here.

The fourth example of the present invention has the same configuration as the above described application monitor apparatus 5a according to the third example of the present invention, more specifically, the application monitor apparatus 5a according to the first example of the present invention shown in FIG. 9, except that the packet transmission decision means 52 of the application monitor apparatus 5a according to the third example of the present invention is modified to have a packet buffer storing packets for each connection.

According to the fourth example of the present invention, when the packet transmission decision means 52 cannot transmit packets received from the IP receiver processing part 51, instead of discarding the packets it stores the packets in a packet buffer and transmits the packets at a time when packet transmission is enabled. At that time, the packet buffer is managed by use of connection units and a decision as to whether or not packets can be transmitted is also made individually for each connection, and thus packets for which transmission is enabled can be given priority for transmission.

Further, when the packet transmission decision means 52 receives packets from the IP receiver processing part 51 it discards packets in accordance with the buffer usage amount of each connection of the packet buffer. Examples of methods for discarding packets include a tail drop method in which packets are simply discarded when the buffer usage amount exceeds a threshold value and a method which discards packets at random utilizing AQM.

Although queue management is executed using connection units in the fourth example of the present invention, the queue units used to carry out packet discarding decisions are not necessarily limited to connection units. For example, methods also exist which determine packet discarding for queues of packets that are grouped by class units defined by DiffServ (see RFC 2474 and RFC 2475), IP address units, application units distinguished by layer 4 port numbers, and the like.

The packet transmission decision means 52 according to the fourth example of the present invention has a configuration and operation that are the same as the packet transmission decision means 42b shown in FIG. 4, and thus a detailed description thereof has been omitted here.

Figure 10:
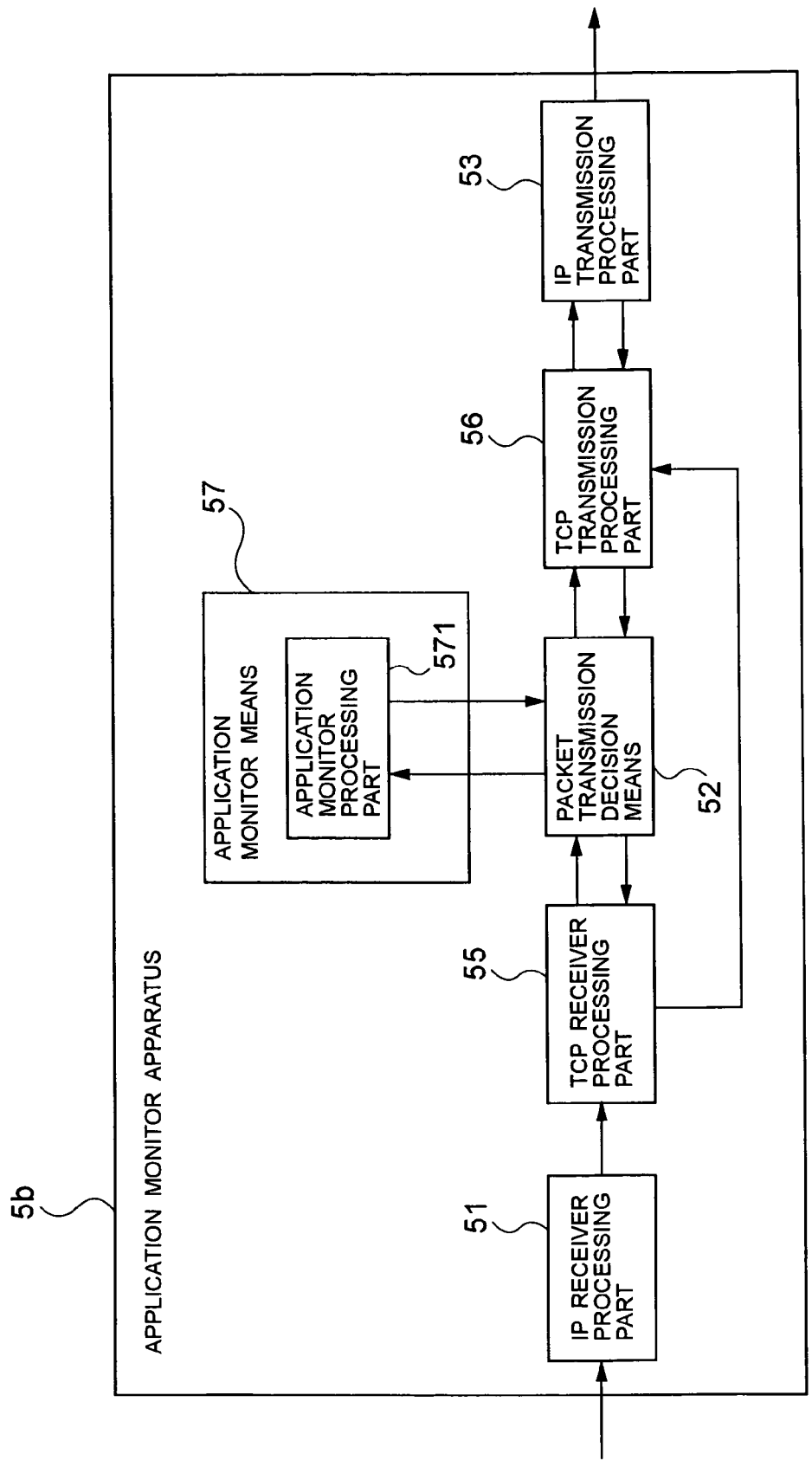
FIG. 10 is a block diagram showing the configuration of an application monitor apparatus according to the fifth example of the present invention.

FIG. 10 is a block diagram showing the configuration of an application monitor apparatus according to the fifth example of the present invention. In FIG. 10, an application monitor apparatus 5b according to the fifth example of the present invention comprises the IP receiver processing part 51, a TCP receiver processing part 55, the packet transmission decision means 52, a TCP transmission processing part 56, the IP transmission processing part 53 and application monitor means 57. The application monitor means 57 is provided with an application monitoring processing part 571.

The IP receiver processing part 51 and the TCP receiver processing part 55 correspond to the above described packet receiving means 41, and the IP transmission processing part 53 and the TCP transmission processing part 56 correspond to the above described packet transmitting means 43. Further, the application monitor means 57 that is provided with the application monitoring processing part 571 corresponds to the above described application monitor means 44.

Packets that are input from a network (not shown) undergo IP termination processing in the IP receiver processing part 51 and are then input to the TCP receiver processing part 55. The TCP receiver processing part 55 performs TCP termination processing for the packets. The TCP transmission processing part 56 performs TCP termination processing for the packets input from the packet transmission decision means 52, and transmits the packets to the IP transmission processing part 53. The IP transmission processing part 53 transmits the packets that are input from the TCP transmission processing part 56 to the network.

The TCP termination processing at the TCP receiver processing part 55 includes transmission processing for ACK (acknowledgement) packets. When the transmission of ACK packets is necessary, the TCP receiver processing part 55 requests the TCP transmission processing part 56 to transmit ACK packets directly.

The application monitor means 57 performs monitoring processing for packets that are input from the packet transmission decision means 52. When the monitoring processing of the application monitor means 57 is not conducted in time, the application monitor means 57 notifies the packet transmission decision means 52 that it cannot receive packets of the corresponding connection.

However, a notification from the application monitor means 57 to the packet transmission decision means 52 need not necessarily use connection units. When the application monitoring processing part 571 cannot perform monitoring processing independently for each connection, it notifies the packet transmission decision means 52 that it cannot receive packets on any of the connections.

The packet transmission decision means 52 reads out from the TCP receiver processing part 55 the packets of connection that are authorized by both the application monitoring processing part 571 and the TCP transmission processing part 56, and outputs the packets to both the application monitoring processing part 571 and the TCP transmission processing part 56.

At the TCP receiver processing part 55, only data that can be sent to both the application monitoring processing part 571 and the TCP transmission processing part 56 is read out. When the processing performance of the application monitoring processing part 571 cannot keep up with the rate of inputting packets to the TCP receiver processing part 55, the packet queue of the corresponding connection builds up at the TCP receiver processing part 55, and as a result rate control of the TCP layer is executed and thus the rate drops autonomously for connection for which processing is delayed.

According to the fifth example of the present invention, feedback from the application monitoring processing part 571 is notified to the TCP receiver processing part 55, and as a result of packets being accumulated at the TCP receiver processing part 55 rate control at the TCP layer is carried out. Thus, effective monitoring processing that does not generate packet loss can be executed.

Next, a method for notifying packet transmission authorization information between a packet transmission decision means, a packet transmitting means and an application monitor means will be described. According to the first to fifth examples of the present invention as described above, the application monitor means and the packet transmitting means issue a notification to the packet transmission decision means to indicate whether or not the transmission of packets is possible. The packet transmission decision means transmits packets to the packet transmitting means and the application monitor means only when it is possible to transmit packets to both the application monitor means and the packet transmitting means.

However, any methods may be utilized for the notification method and transmission method as long as it is guaranteed that the same packets are transmitted to both the application monitor means and the packet transmitting means from the packet transmission decision means. One example thereof is described as the sixth example of the present invention. The following description uses the configuration of the application monitor apparatus 4 according to the embodiment of the present invention shown in FIG. 1.

After the packet transmission decision means 42 stores packets received from the packet receiving means 41 in a packet buffer (not shown), it notifies the application monitor means 44 and the packet transmitting means 43 of the data amount that can be transmitted. The application monitor means 44 and the packet transmitting means 43 respectively and independently read out and process the data that can be transmitted.

When both the application monitor means 44 and the packet transmitting means 43 have completed reading out the data, the packet transmission decision means 42 determines that packet transmission is completed and deletes the corresponding packets from the packet buffer.

According to the sixth example of the present invention, since the application monitor means 44 and the packet transmitting means 43 independently read out packets, an effect is obtained whereby it is possible to eliminate the dependency relationship between the application monitor means 44 and the packet transmitting means 43.

Further, according to the sixth example of the present invention, it is possible to flexibly adjust the packet readout amount in accordance with the load states of the application monitor means 44 and the packet transmitting means 43.

The packet transmission decision means 42 according to the sixth example of the present invention has the same operation and configuration as the packet transmission decision means 42c shown in FIG. 6, and thus a description thereof is omitted here.

The seventh example of the present invention is one in which the following change is added to the above-described second example, fourth example and fifth example of the present invention.

The application monitor means 54, 57 has a function that determines whether or not monitoring processing is necessary for each connection. For the connection that the application monitor means 54, 57 determined that monitoring processing is necessary, monitoring processing is executed as described above in the aforementioned second example, fourth example and fifth example of the present invention. When the monitoring processing can not be conducted in time, a notification that packets cannot be received at the connection is sent to the packet transmitting means (IP transmission processing part 53 and TCP transmission processing part 56).

For the connection for which the application monitor means 54, 57 determine as the result of monitoring processing that the monitoring processing is unnecessary, the application monitor means 54, 57 notify the packet transmission decision means 52 that reception of packets is always possible. The application monitor means 54, 57 then discard the packets received from the packet transmission decision means 52 without performing processing.

According to the seventh example of the present invention, since the application monitor means has a function that discards the received packets of the connection for which the monitoring processing is unnecessary, the execution of unnecessary monitoring processing can be eliminated to enable overall high-speed monitoring processing.

The eight example of the present invention is one in which the following change is added to the above-described seventh example of the present invention.

For the connection for which the application monitor means 54, 57 determined as the result of monitoring processing that the monitoring processing is unnecessary, the application monitor means 54, 57 notify the packet transmission decision means 52 that the monitoring processing is unnecessary.

For the connection for which the application monitor means 54, 57 determined that the monitoring processing is unnecessary, the packet transmission decision means 52 thereafter does not output packets to the application monitoring processing part 541, 571 and transmits packets only to the packet transmitting means (IP transmission processing part 53, TCP transmission processing part 56) in accordance with only a determination as to whether it is possible to transmit packets to the packet transmitting means.

According to the eighth example of the present invention, for the connection for which the monitoring processing is unnecessary there is no longer a necessity to transmit packets to the application monitor means 54, 57, and the application monitor means 54, 57 need only perform processing for the connection for which the monitoring is required. As a result, it is possible to execute high-speed monitoring processing.

Figure 11:
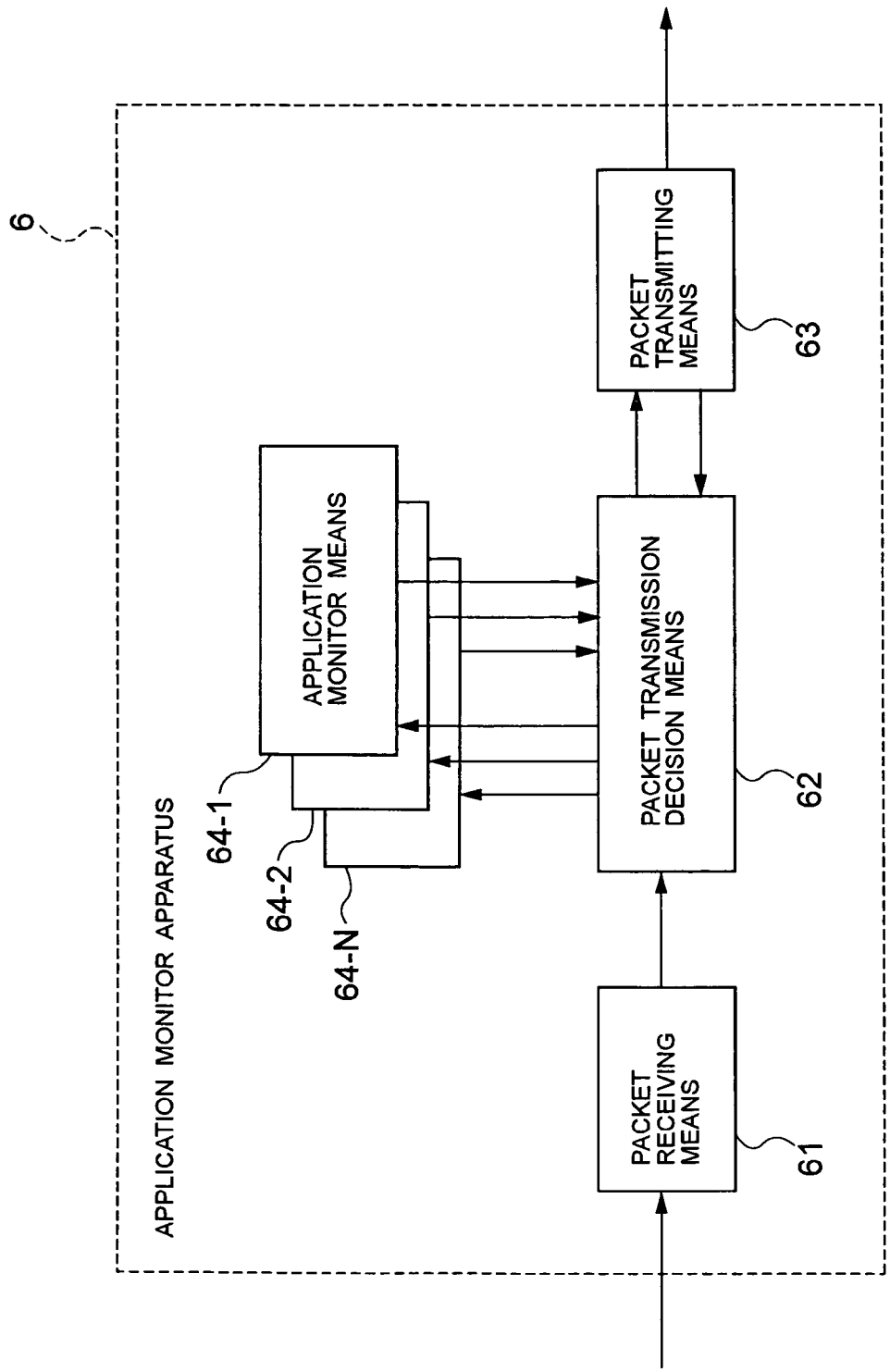
FIG. 11 is a block diagram showing the configuration of an application monitor apparatus according to the ninth example of the present invention.
Figure 12:
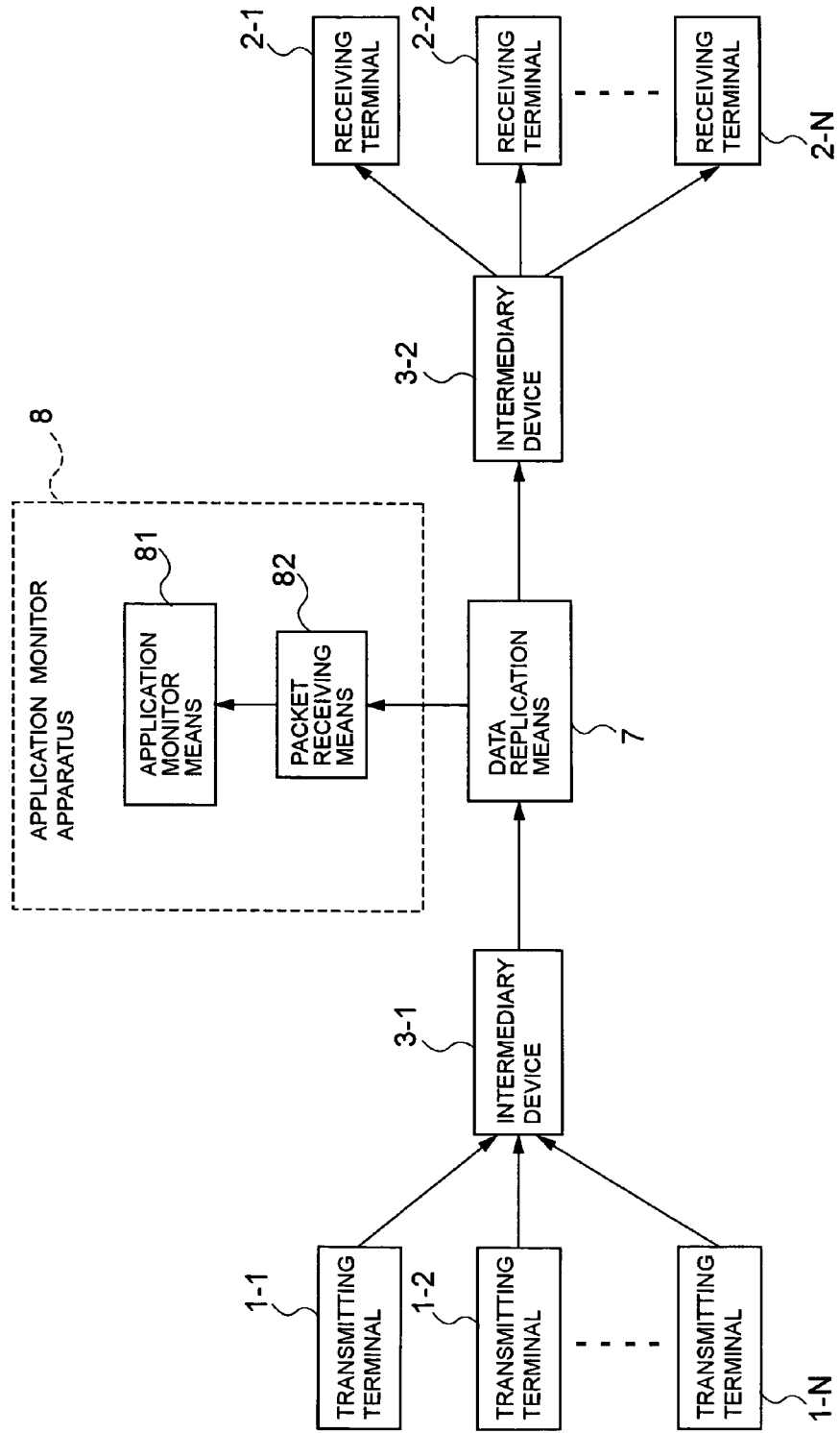
FIG. 12 is a block diagram showing the configuration of an application monitor apparatus that utilized the conventional first method.
Figure 13:
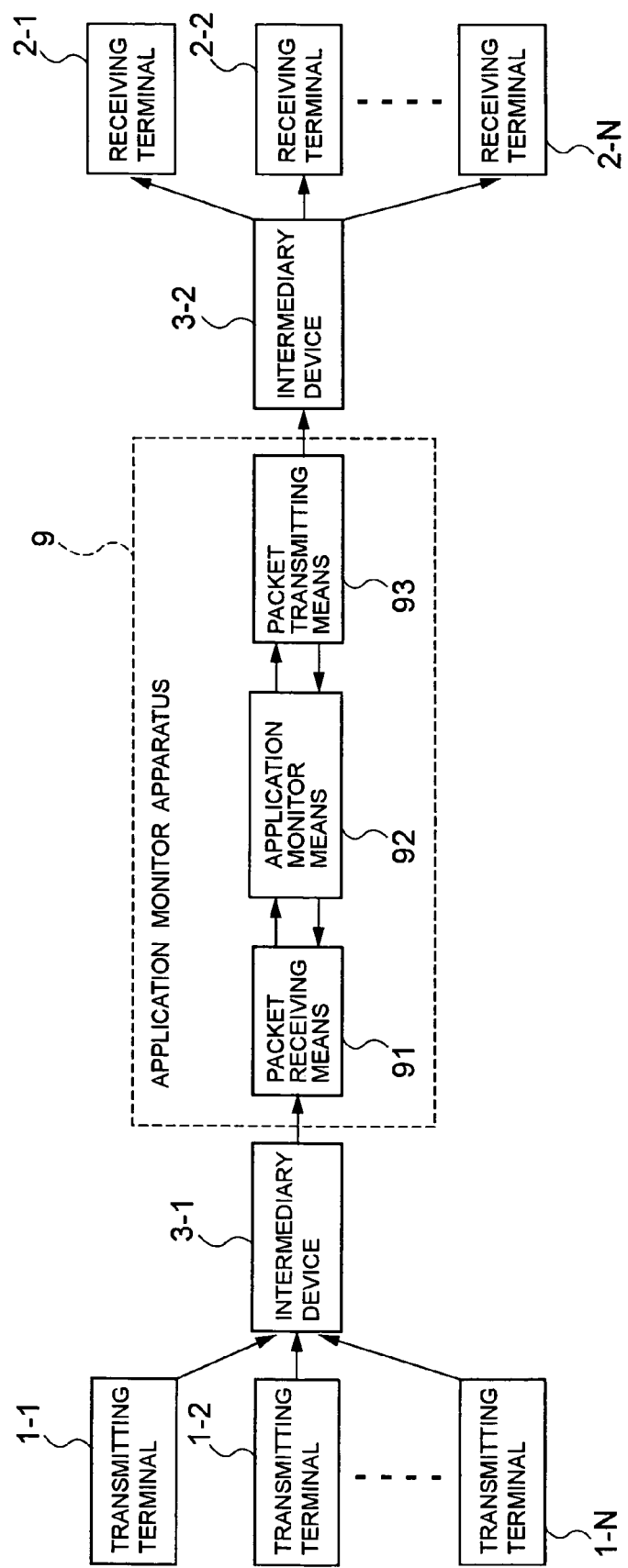
FIG. 13 is a block diagram showing the configuration of an application monitor apparatus that utilized the conventional second method.
Figure 14:
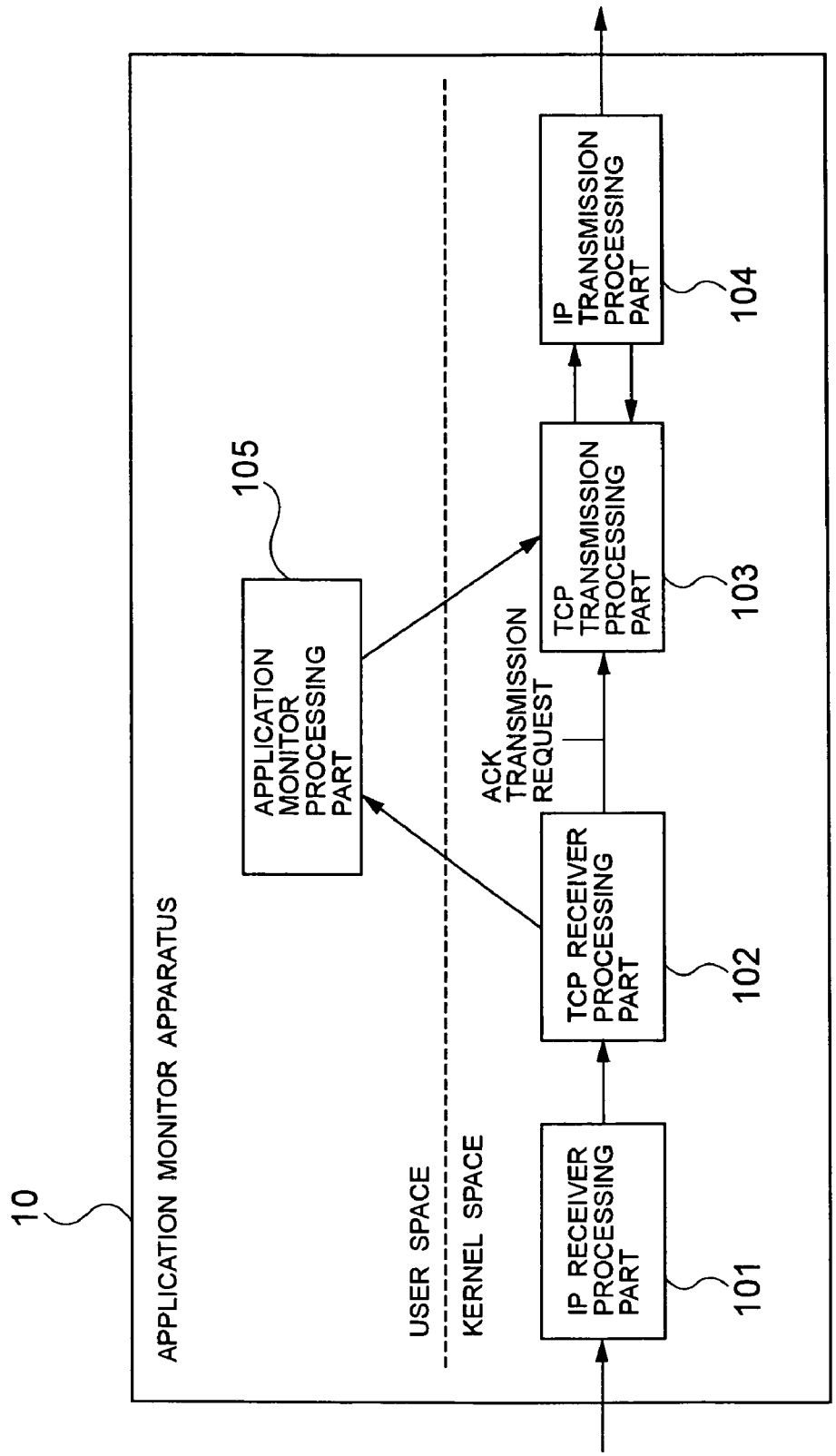
FIG. 14 is a block diagram showing the detailed configuration of an application monitor apparatus that utilized the conventional second method.

FIG. 11 is a block diagram showing the configuration of an application monitor apparatus according to the ninth example of the present invention. Although only one of the application monitor means 54, 57 is respectively provided in the above described first to eighth examples of the present invention, in an application monitor apparatus 6 according to the ninth example of the present invention, a packet transmission decision means 62 is connected to a plurality of application monitor means 64-1 to 64-N.

In FIG. 11, the application monitor apparatus 6 according to the ninth example of the present invention comprises packet receiving means 61, packet transmission decision means 62, packet transmitting means 63 and a plurality of application monitor means 64-1 to 64-N.

The packet transmission decision means 62 transmits packets to all the application monitor means 64-1 to 64-N and the packet transmitting means 63 only when all the application monitor means 64-1 to 64-N and the packet transmitting means 63 have authorized the transmission of packets.

An advantage of providing a plurality of application monitor means is that processing is speeded-up by simplifying the functions required for the monitoring processing of one application monitor means. By simplifying the monitoring processing it is also possible to employ hardware for the application monitor means 64-1 to 64-N to speed-up processing.

For example, taking the case of an e-mail monitor apparatus, an example can be considered in which one application monitor means is customized to only extract user information from an e-mail and another application monitor means determines whether or not a particular keyword is included in the e-mail.

What is claimed is:

1. An application monitor apparatus, comprising:
packet receiving means that receives packets from a network,
packet transmitting means that transmits packets to the network, and
application monitor means that performs monitoring processing for the packets that are received by the packet receiving means;
wherein the application monitor apparatus has packet transmission decision means that includes means that transmits packets input from the packet receiving means to both the application monitor means and the packet transmitting means, and
decision means that decides whether to transmit the packets input from the packet receiving means to both the application monitor means and the packet transmitting means on the basis of information from the application monitor means and the packet transmitting means, respectively;
wherein each of the application monitor means and the packet transmitting means notifies the packet transmission decision means of a packet transmission authorization information for a connection between a source terminal that transmits the packets and a destination terminal that receives the packets;
the packet transmission decision means includes a management table which stores the packet transmission authorization information;
when the packet transmission decision means receives a packet from the packet receiving means, the packet transmission decision means refers to the management table, and transmits the received packet to both the application monitor means and the packet transmitting means if the stored packet transmission authorization information for the connection to which the received packet belongs indicates authorization of the transmission of the packet; and
wherein the packet transmission decision means transmits the received packet to both the application monitor means and the packet transmitting means only if both the packet transmission authorization information from the application monitor means and the packet transmission authorization information from the packet transmitting means indicate authorization of the transmission of the packet.

2. The application monitor apparatus according to claim 1, wherein the packet transmission decision means transmits the packets only if the transmission of the packets to both the application monitor means and the packet transmitting means is authorized by packet transmission authorization information that shows whether the transmission of the packets is authorized that is input from both the application monitor means and the packet transmitting means, and otherwise the packet transmission decision means discards the packets.

3. The application monitor apparatus according to claim 2, wherein the connection comprises a plurality of connections, and
wherein when the packet transmission authorization information from both the application monitor means and the packet transmitting means is notified separately for each of the plurality of connections, the packet transmission decision means decides whether to transmit the packets to both the application monitor means and the packet transmitting means for each of the plurality of connections or to discard the packets for each of the plurality of connections.

4. The application monitor apparatus according to claim 1, wherein the packet transmission decision means includes a packet buffer that stores the packets, and transmits the packets only if the transmission of the packets is authorized by both the application monitor means and the packet transmitting means, and otherwise stores the packets in the packet buffer.

5. The application monitor apparatus according to claim 4, wherein, when the packets are input from the packet receiving means, the packet transmission decision means performs discard processing of the packets based on a packet storage amount of the packet buffer.

6. The application monitor apparatus according to claim 4, wherein the connection comprises a plurality of connections, and
wherein when packet transmission authorization information is input from both the application monitor means and the packet transmitting means and indicates whether the transmission of the packets is authorized is notified separately for each of the plurality of connections, the packet transmission decision means decides whether to transmit the packets separately for each of the plurality of connections, and manages the packet buffer for each of the plurality of connections to transmit the packets of each of the plurality of connections to which the transmission is authorized.

7. The application monitor apparatus according to claim 6, wherein the packet transmission decision means manages packet storage amounts of the packet buffer separately for each of the plurality of connections, and when the packets are input from the packet receiving means the packet transmission decision means performs discard processing of the packets based on the packet storage amount that is managed for each of the plurality of connections.

8. The application monitor apparatus according to claim 3, the application monitor means further comprising means that determines whether the monitoring processing is necessary for each of the plurality of connections and means that outputs to the packet transmission decision means decision information indicating whether the monitoring processing is necessary for each of the plurality of connections,
wherein the packet transmission decision means inhibits data output to the application monitor means for each of the plurality of connections for which the monitoring processing is unnecessary and transmits the packets to the packet transmitting means on the basis of only information from the packet transmitting means.

9. The application monitor apparatus according to claim 3, the application monitor means further comprising means that determines whether the monitoring processing is necessary for each of the plurality of connections, means that outputs to the packet transmission decision means information indicating that reception of the packets is always possible with respect to each of the plurality of connections for which the monitoring processing is unnecessary, and means that discards the packets that are input from the packet transmission decision means.

10. The application monitor apparatus according to claim 1, Wherein the packet receiving means performs termination processing up to layer 3 for reception of the packets, the packet transmitting means performs termination processing up to layer 3 for transmission of the packets, and the application monitor means executes the monitoring processing of received packets after rearranging the packets in accordance with a byte-sequence ordering of the packets and Transmission Control Protocol (TCP) specifications of layer 4.

11. The application monitor apparatus according to claim 1, wherein the packet receiving means performs termination processing up to layer 4 for reception of the packets, the packet transmitting means performs termination processing up to layer 4 for transmission of the packets, and the packet transmission decision means reads out the packets from the packet receiving means when the packets can be transmitted to both the application monitor means and the packet transmitting means.

12. An application monitor apparatus, comprising:
packet receiving means that receives packets from a network,
packet transmitting means that transmits packets to the network, and
application monitor means that performs monitoring processing for the packets that are received by the packet receiving means;
wherein the application monitor apparatus has packet transmission decision means that includes means that transmits packets input from the packet receiving means to both the application monitor means and the packet transmitting means, and
decision means that decides whether to transmit the packets input from the packet receiving means to both the application monitor means and the packet transmitting means on the basis of information from the application monitor means and the packet transmitting means, respectively;
wherein each of the application monitor means and the packet transmitting means notifies the packet transmission decision means of a packet transmission authorization information for each of at least one a connection between a source terminal that transmits the packets and a destination terminal that receives the packets;
the packet transmission decision means includes a management table which stores the packet transmission authorization information;
when the packet transmission decision means receives a packet from the packet receiving means, the packet transmission decision means refers to the management table, and transmits the received packet to the application monitor means and the packet transmitting means if the stored packet transmission authorization information for the connection to which the received packet belongs indicates authorization of the transmission of the packet,
wherein the packet receiving means performs termination processing up to layer 4 for reception of the packets, the packet transmitting means performs termination processing up to layer 4 for transmission of the packets, the packet transmission decision means enables transmission of the packets independently to the application monitor means and the packet transmitting means, respectively, and the packet receiving means releases only packets that are read from both the application monitor means and the packet transmitting means.

13. The application monitor apparatus according to claim 11, wherein the application monitor means and the packet transmitting means respectively notify the packet transmission decision means of packet transmission authorization information showing whether transmission of the packets is authorized for the connection, and the packet transmission decision means reads out the packets from the packet receiving means for the connection.

14. The application monitor apparatus according to claim 11, wherein the packet receiving means includes a packet buffer for layer 4 termination processing managed for the connection and performs rate control that is adjusted to the processing performance of the application monitor means by performing the layer 4 rate control in accordance with a packet buffer amount managed for the connection.

15. The application monitor apparatus according to claim 1, wherein:
the application monitor means comprises a plurality of the application monitor means, the plurality of application monitor means each having a monitoring function different than other application monitor means among the plurality of application monitor means;
the packet transmission decision means includes means that outputs the packets to each of the plurality of application monitor means and the packet transmitting means; and
the packet transmission decision means performs transmission of the packets only a if it is determined that the transmission of the packets is authorized to each of the application monitor means and the packet transmitting means.

16. The application monitor apparatus according to claim 1, wherein the application monitor means and the packet transmitting means notify the packet transmission decision means of the packet transmission authorization information based on each result of a comparison between a packet processing speed of each of the packet transmitting mans and the application monitor means, and a rate of receiving of the packets by the packet receiving means from the network.

17. The application monitor apparatus according to claim 1, wherein the packet transmission decision means includes a buffer receiving the packets from the packet receiving means, and the management table manages a buffer storage amount of the buffer, a transmission authorization amount of the application monitor means and the transmission authorization amount of the packet transmitting means for the connection.

\* \* \* \* \*